Nov. 14, 1967  M. E. JAMES, SR  3,352,512
EXPRESS TRANSPORTATION SYSTEMS
Filed May 25, 1964  2 Sheets-Sheet 1
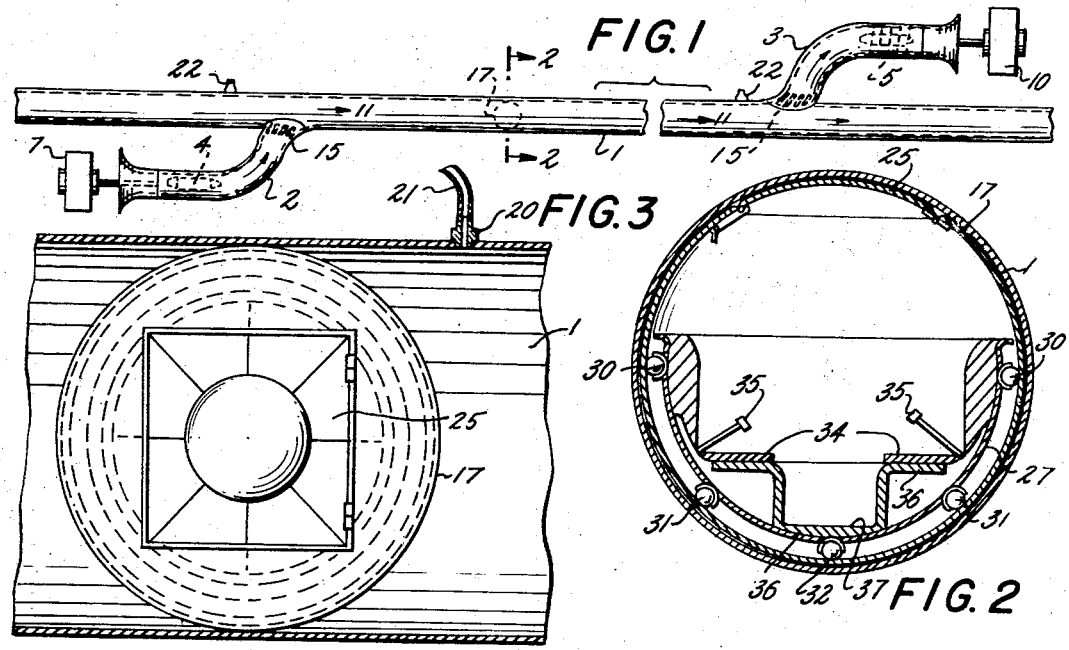
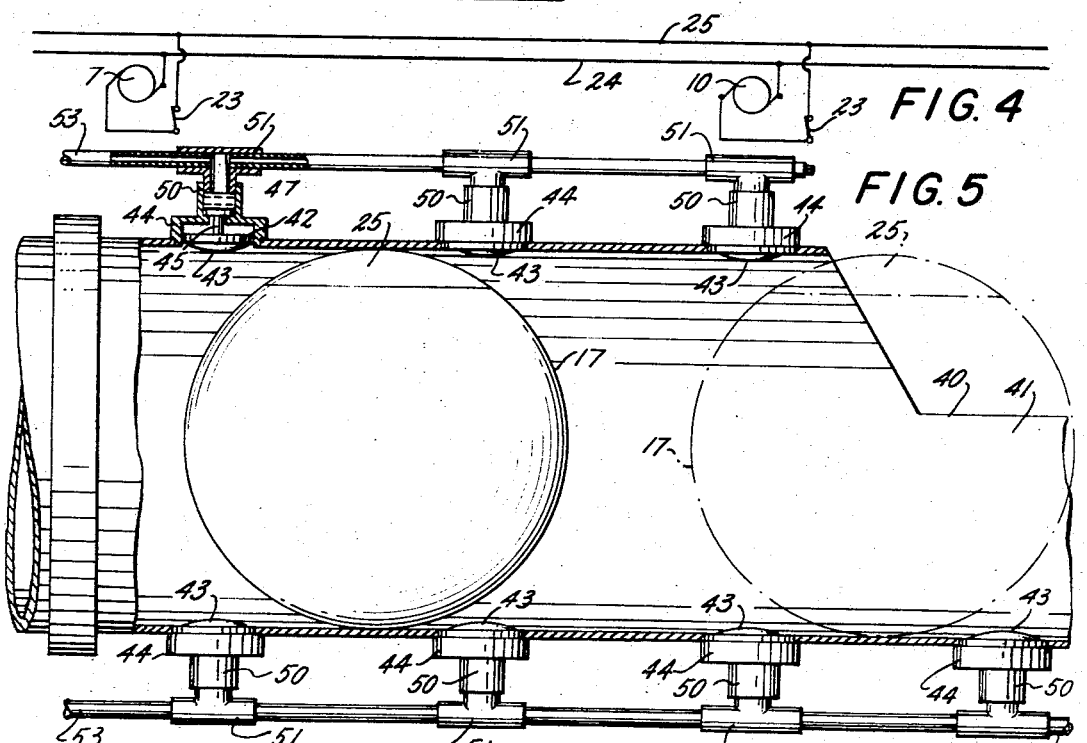
INVENTOR.
MITCHELL E. JAMES, Sr.
BY Henry J. E. Metzler
ATTORNEY

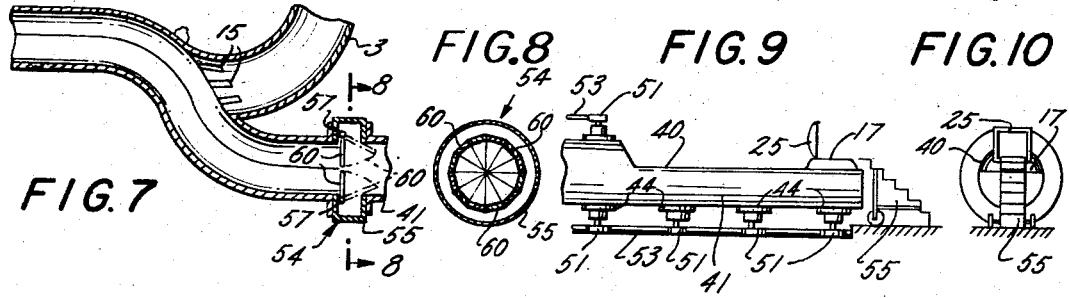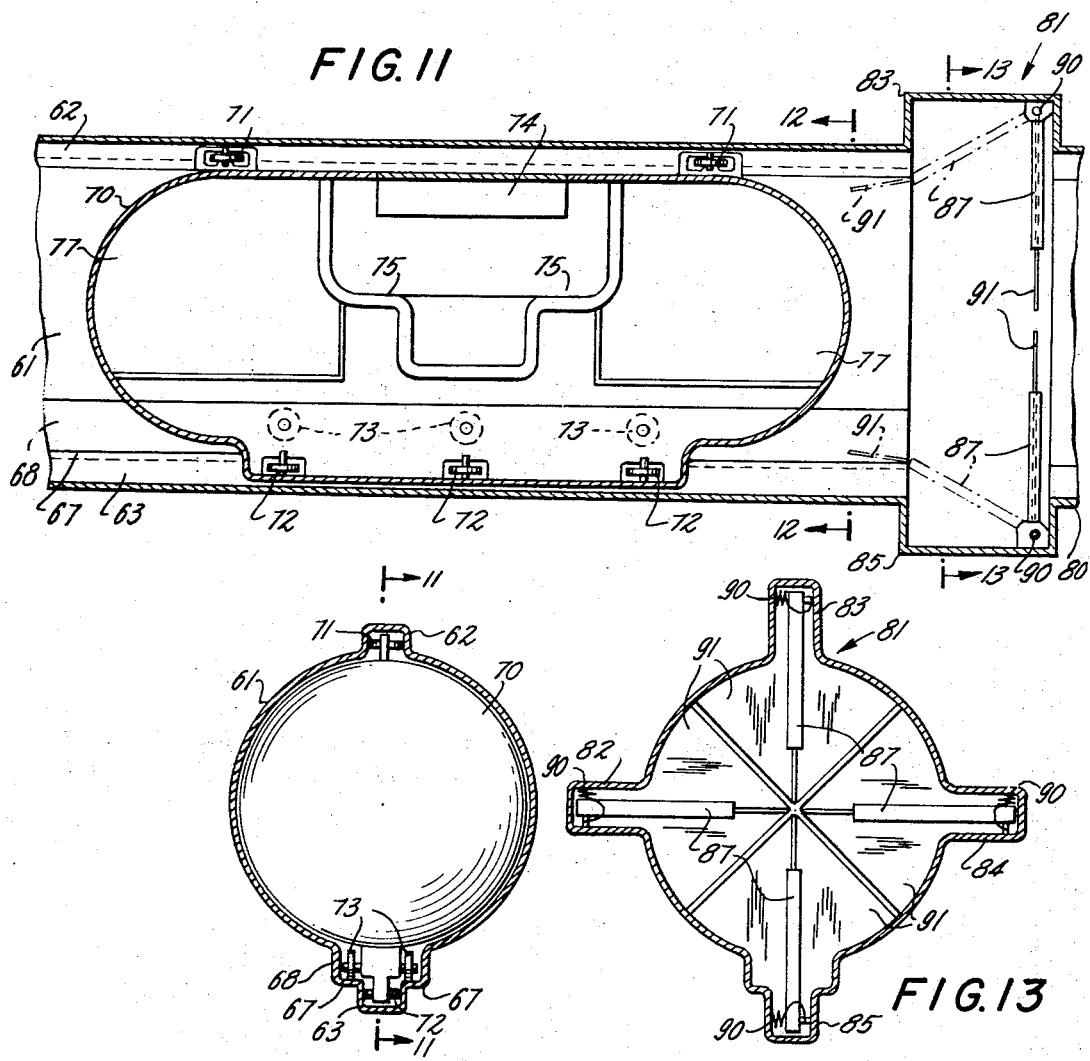

United States Patent Office 3,352,512
Patented Nov. 14, 1967

3,352,512
EXPRESS TRANSPORTATION SYSTEMS
Mitchell E. James, Sr., 5 Carroll St.,
Bangor, Maine 04401
Filed May 25, 1964, Ser. No. 369,998
4 Claims. (Cl. 243—2)

The present invention relates to improvements in transportation and high-speed conveyance systems of the type in which a vehicle is guided and propelled through a continuous tube or tunnel, with the vehicle and tube having substantially similar cross sectional contours, more specifically, the present invention relates to a system of transportation, which I prefer to call "Ball-O-Nova Express System," that uses vehicles which are of a spherical or partially-spherical formation and which are forced by means of air pressure and air suction through tubes or the like at high speeds, thereby using air primarily as anti-friction element or lubricant.

One object of the present invention is the provision of a transportation system of the character described which is safe, economical and practical and is well adapted for swiftly exchanging passengers between other forms of transportation, for instance from air ports to trains or buses or the like, and which can operate independently of weather conditions, which will help in the elimination of congestions in highly populated areas and which will reduce to a minimum the space requirements for public systems since each vehicle is only slightly smaller in cross-section than the tubes through which it travels because it does not require any large space-requiring wheels or a chassis for carrying the vehicle body.

Another object of the present invention is the provision of a transportation system of the character described which affords comfortable seating, easy loading and unloading, and which maintains the passengers in an upright position at all times while the vehicle is being forced thruogh tubes like a projectile at substantially higher speeds than was hitherto possible with public land transportation equipment.

A further object of the present invention is the provision of a transportation system of the character described which is provided in the tubes, through which the vehicles travel, with specially designed flexible valves which open and close merely due to differential pressure conditons, and which—when closed—seal off portions of the tubes from the rest of the system, so as to eliminate the possibility of a vehicle, if powdered, accidentally crashing into a bulkhead or the like due to electrical, mechanical, hydraulic or pneumatic failures.

Yet a still further object of the present invention is the provision of a transportation system of the character described which reduces to a minimum the discomfort factor of weightlessness sensations due to sudden and abrupt changes in altitudes or from inclines to declines, which sensations are usually experienced by passengers in airplanes, boats and land vehicles of the hitherto known types, and which also reduces substantially the amount of torque that normally has to be compensated by pendular action to keep the passengers upright if a vehicle, a vessel or an airplane is twisting laterally at high speeds.

Another object of the present invention is the provision of a transportation system of the character described which does not need pilots or engineers for each vehicle, nor does it require its passengers to participate in the operation of a vehicle, and which has a minimum of moving or working parts, thus being very simple in construction, reduces substantially the margin of error and is highly superior in safety and reliability to any other vehicles or transportation devices.

With the foregoing and other objects which will appear as the description proceeds, the invention consists of cretain novel details of construction and combinations of parts hereinafter more fully described and pointed out in the claims, it being understood that changes may be made in the construction and arrangements of parts of the embodiment disclosed without departing from the spirit of the invention as claimed.

In the accompanying drawing I have set forth an illustrative embodiment of my invention.

In said drawing:

FIGURE 1 is a side view of a portion of a transportation system based upon an embodiment of the present invention;

FIG. 2 is an enlarged sectional view on the line 2—2 of FIG. 1;

FIG. 3 is a top plan view of a vehicle as it appears in a tube shown in longitudinal section;

FIG. 4 is a wiring diagram;

FIG. 5 is an enlarged detailed vertical, fractional sectional view of a brake portion of a tube near a passenger loading and unloading station platform, or embarkation office;

FIG. 6 is a fractional bottom plan view of a detail of a brake system;

FIG. 7 is a fractional vertical sectional view of a compressor line junction and sealing valve portion of a pipe system;

FIG. 8 is a sectional view on the line 8—8 of FIG. 7;

FIG. 9 is a fractional side vew of an end portion of a tube system with a passenger loading device;

FIG. 10 is an end view of the tube portion and of the passenger loading device of FIG. 9;

FIG. 11 is an enlarged, sectional, fractional view of a modification on the line 11—11 of FIG. 12;

FIG. 12 is a cross-sectional view on the line 12—12 of FIG. 11; and,

FIG. 13 is a cross-sectional view on the line 13—13 of FIG. 11.

Similar reference characters refer to similar parts throughout the several views.

Referring first to FIGS. 1 to 4, the numeral 1 denotes a tube or tunnel into which terminate lateral branch tubes 2 and 3 that are angularly disposed to the tube 1, preferably at acute angles. The branch tubes 2 and 3 are connected to compressors 4 or to air motion devices 5, which are driven by motors 7 and 10, respectively, and which are adapted to cause a forceful current of air, or of any other suitable fluid, to pass rapidly through the pipe or tunnel 1 in the direction of the arrows 11. The branch tubes 2 and 3 are separated from the main tube 1 by any suitable means, for instance by means of fins or grills 15. A spherical body 17, which has an outer diameter that is slightly smaller than the inner diameter of the tube or tunnel 1, is movable in the tube 1 by means of the aforementioned current created by the compressors 4 and suction devices 5. While the dimensions of the items 1, 2, 3 and 17 may be chosen according to the individual requirements of each transportation system, I have found that an inner diameter of the tube 1 of five feet, and an outer diameter of four feet and eleven inches of the spherical body 17 are usually satisfactory. The length of each tube 1, and the distances between the branch tubes 2 and 3 also may be determined according to local requirements and to the availability of standard tube sizes, and any number of single tube units may be joined to each other by the usual connection elements used for large pipe lines of the like, in order to obtain tubular transportation systems of any desired length from, for instance, several hundred yards to many miles length. Each tubular transportation system is not limited to have only one spherical member 17 travel therethrough, but several such members 17 may be used in spaced relation to each other.

The members 17 are forced through the tubes 1 at very high speeds, which is facilitated by a minimum of mechanical friction, since each member 17 actually floats primarily on compressed air within the tubes 1. Whatever of mechanical friction is to be overcome may be reduced substantially by means of lubrication inlets 20 (FIG. 3) which, at certain distances from each other, may be installed in the tubes 1, for forcing any suitable lubricant, for instance graphite or talcum, into the tubes 1 through supply pipes 21.

In addition to the lubrication inlets 20, I prefer to extend into the tubes 1, at certain distances from each other switch activating members 22, which cause an alternate opening and closing of switches 23 (FIG. 4) by the members 17 as they pass said activating members 22. The switches 23 connect the motors 7 and 10, if they are electric motors, to cables 24 and 25, which are conductively connected to a source of electric current. In this way the motors 7 and 10 driving the compressors 4 and suction devices 5 are being switched on and/or off by each member 17 as it is speeding through the tubes 1, so that there will always be operating a working compressor 4 in back and a suction device 5 in front of each member 17. If the items 4 and 5 are being driven by engines other than electric motors, the switches 23 may control an electrical control circuit, or relays, or signals which indicate to operators of diesel engines or the like that certain units should be put into operation at full speed while others may be allowed to idle.

Each spherical member 17 has a hatch 25, which preferably is square, and which is hinged to a portion of the member 17 surrounding an opening that affords a convenient access to the interior of the member 17. If the members 17 are to be used for dead express freight, for instance for rushing air freight from a plane to a truck, or the like, no further installation in each vehicle is necessary. However, if the members 17 are to be used for speedy transportation of people, the interior of each member 17 will have to be equipped with seats and with means for always keeping the passengers in a substantially upright position, irrespective of any rolling movements or lateral or angular or twisting movements of the member 17 while it is speeding through the tubes 1. I prefer to carry out this feature of my invention in the manner shown in FIGURE 2, where it will be seen that a second member 27 is movably arranged within the outer spherical member 17. The member 27 could likewise be made as a spherical member or it could be of any other desired formation. However, I prefer to make it as a shell of a substantially semi-spherical formation which preferably is somewhat larger than a hollow hemisphere. If instead of the term "semi" the word half or fifty percent is being used, a semi-spherical member could be termed a fifty percent spherical member, and in this case a good description of my most preferred form of the member 27 would be a sixty percent spherical hollow member. Any suitable antifriction means are interposed between the members 17 and 27; in the instance shown said antifriction means are rows of ball bearing balls 30, 31 and 32. Seats 34 with seat belts 35 are mounted on the inner side of the member 27, and are designed for a comfortable seating capacity of six to eight persons, if the member 17 has the aforesaid outer diameter of four feet and eleven inches. The arrangement of the seats 34 as shown in FIG. 2 provides for a low center of gravity, so that the member 27—when occupied—has a tendency for maintaining the upright position shown in FIG. 4. However, to equalize any unsymmetrically distributed load, I prefer to mount weights 36 beneath the leg room space 37, and/or beneath the seats 34. In this way passengers are able to travel comfortably, irrespective of how high the speed is at which the vehicle 17 passes through the tubes 1, and the passengers always will be in an upright position.

At the end of each line, or at stations intermediate the ends of a line, a horizontal upper portion of the tube 1 is open by cutting it partially at 40 or by using specially designed terminal tubes 41, as is indicated in FIGS. 5 and 9. The estimated travel speed being five hundred miles per hour, it is necessary that any suitable braking equipment is installed at, and adjacent, the terminals. A preferred braking system as shown in FIGS. 5, 6, and 9 consists of a plurality of brake plungers 42 of metal or plastic material which are radially extended into the tube 1 or into terminal tubes 41, and which are provided with cushioning friction heads 43 of felt or other suitable comparatively soft material. The plungers 42 are slidable in cylinders 44. Each brake plunger 42 is connected by means of a rod 45 to a piston 47 (FIG. 5) which is slidable in a reduced tubular portion 50. Each portion 50 is connected, by means of a T-member 51 to a hydraulic line 53. As long as there is no pressure in the hydraulic line 53 the members 42, 43, 45 and 47 are pushed back into the elements 44 and 50 by the air pressure in front of the on rushing element 17, within the pipes 1 or 41, so that a member 17 which is destined to pass a terminal without stopping—like an express conveyance—can pass by the withdrawn elements 43 without delay. But if it is intended to stop a member 17 at a terminal, the fluid in the line 53 is under pressure, so that the members 42, 43, 45 and 47 are being forced toward the interior of the pipes 1 or 41, thus subjecting the member 17 to the friction and braking action of the elements 43, so as to stop the member 17 gradually at the terminal. When the member 17 has come to a halt at the open portion 40, the hatch 25 can be opened, and the passengers who have terminated the voyage can alight with the aid of a loading stairway 55, and other passengers can enter the vehicle 17 from a ticket office (not shown) or from a waiting room. I prefer to branch the terminal tubes 41 off the main tubes 1, as may be seen in FIG. 7. In order to reduce the air pressure in the terminal tubes 41, I prefer to place a valve member 54 at an end of each terminal tube 41. The valve member 54 can be of any suitable design and construction, which allows a member 17 to pass therethrough and which automatically closes the tube 41 after a member 17 has passed through the valve member 54. In the instance shown in FIGS. 7 and 8, the valve member 54 consists of an annular member 55 flanged to the tube 41 and having resiliently hinged to its inner side, at 57 (FIG. 7), a plurality of flags 60, which preferably are of triangular formation, decreasing in width toward the center of the tube 41 or the member 55 and which have a tendency to assume the vertical position shown in FIGS. 7 and 8. If a member 17 passes through a valve member 54, the flaps 60 are forced out of the way of the member 17 by the member 17 itself, so that they are momentarily in a substantially horizontal position in the annular member 55, as indicated in dash-and-dotted lines in FIG. 7. As soon as a member 17 has passed through a valve member 54, the resiliency of the hinge arrangement or/and of the flaps 60 forces them back into the vertical position shown in full lines in FIGS. 7 and 8, so that the valve member 54 is closed, sealing the terminal pipe 41 off from the rest of the system of tubes 1.

Referring now to the modification of FIGS. 11 to 13 inclusive, the numeral 61 denotes a tube or a tunnel which is similar to the tube 1 of FIGS. 1 to 3, but which has outwardly extending rib portions 62 and 63 running along its upper and lower sides. Horizontal shoulder sections 67 and a widened rib section 68 are interposed between the main portion of the tube 61 and the lower rib portion 63. A vehicle 70 which is of a longitudinal and cross-sectionally circular formation, and which may be provided with semi-spherical or streamlined end portions, is slidable in the tube 61. The vehicle 70 has upper and lower horizontal guide rollers 71 and 72 respectively, as well as vertical supporting rollers 73. The rollers 71, 72 and 73 are rotatably mounted on the outer side of the vehicle. The rollers 71 engage the rib 62, the rollers 72 engage the rib 63, and the rollers 73 engage the upper sides of the shoulders 67, as friction-reducing means. The vehicle 70 is designed to be forced through a system of tubes 61 by means of air pressure and suction in substantially the same manner as the member 17 of FIGS. 1 to 5. The vehicle 70 has in its top an opening that is normally closed by a hatch 74 (FIG. 11) and it has seats 75 as well as luggage or freight spaces 77. Terminal pipes 80 (FIG. 11) or the like can be separated and sealed off from the main tubes 61 by means of valve members 81, which operate on the same principle as the valve members 54 of FIGS. 7 and 8. As may be seen in FIGS. 11 and 13, each valve member 81 has at least four outwardly extending rib portions 82, 83, 84, and 85, in which rods 87 are resiliently pivoted at 90, and to each rod 87 is attached a flap member 91 with its center portion while its outer edge portion is attached to an interior section of the tube 61. If a vehicle 70 hits the rods 87, as the vehicle passes through a valve 81, the rods 87 and the flaps 91 move from their vertical positions shown in full lines to substantially horizontal positions as indicated by dash-and-dotted lines in FIG. 11. After the vehicle 70 has passed a valve 81, the valve elements 87 and 91 are forced back into their original position as shown by full lines in FIGS. 11 and 13.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent is:

1. In a transportation system, in combination, tubular passageway means of indeterminate length, vehicle means movable in said passageway means substantially in sealing relation thereto, said passageway means including means for decelerating said vehicle means comprising a plurality of longitudinally spaced radially movable pistons for frictional engagement with the exterior of the vehicle means when projected radially inwardly, and actuating means for moving said pistons inwardly and for retracting them outwardly away from said frictional engagement, said vehicle means including an outer spherical shell provided with access closure means for said substantially sealing engagement with the interior of the passageway means for movement therein, hemispherical load-carrying structure carried within said spherical shell and means for supporting it thereon for free gyratory relative movement with respect thereto in response to equilibrium forces generated by movement of the vehicle means, at least one compressor means having outlet means in communication with the interior of the passageway means for introducing air under pressure thereto in one direction without obstructing said vehicle means, suction means including inlet means in communication with the interior of the passageway means spaced downstream of said compressors for assisting the flow of air without obstructing said vehicle means, and means for sensing the approach of a vehicle means to said outlet and inlet to activate said compressor means and suction means to propel said vehicle means in said passageway means.

2. The invention as defined in claim 1, wherein said load-carrying structure includes seating means for accommodating passengers.

3. The invention as defined in claim 1, wherein said passageway means is provided with at least two longitudinally extending circumferentially spaced track means, and said vehicle means includes wheel means for rolling engagement with the track means.

4. The invention as defined in claim 3, wherein said track means includes radially outwardly projecting slotted portions, said wheel means including means in rolling engagement with the bottom and side portions of said slotted portions.

References Cited

UNITED STATES PATENTS

| | | | |
|---|---|---|---|
| 91,513 | 6/1896 | Brisbane | 243—32 |
| 891,416 | 6/1908 | Fenyo | 104—138 |
| 1,053,368 | 2/1913 | Eells | 104—155 |
| 1,813,625 | 7/1931 | Knox | 104—155 |
| 2,014,571 | 9/1935 | Jennings | 243—32 |
| 2,839,164 | 6/1958 | Roussel | 188—67 |
| 2,888,218 | 5/1959 | Kuhn | 243—32 |

EVON C. BLUNK, *Primary Examiner.*

SAMUEL F. COLEMAN, *Examiner.*

H. HORNSBY, *Assistant Examiner.*